March 20, 1962 L. M. KEIGHLEY 3,025,679
REFRIGERATION
Filed May 15, 1961
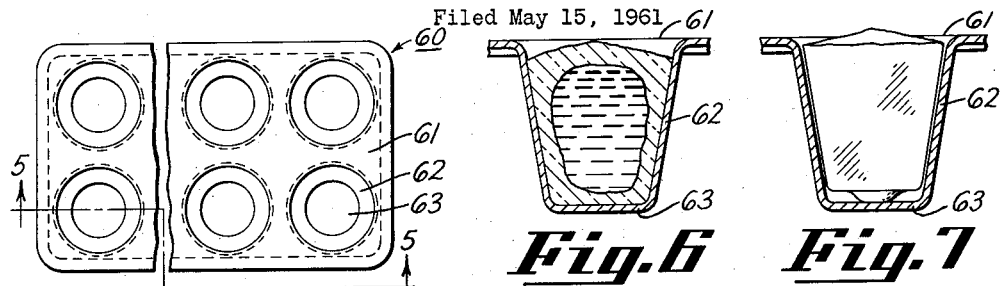
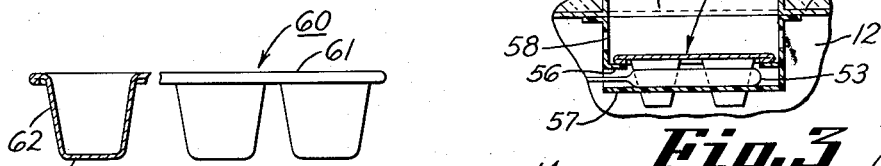
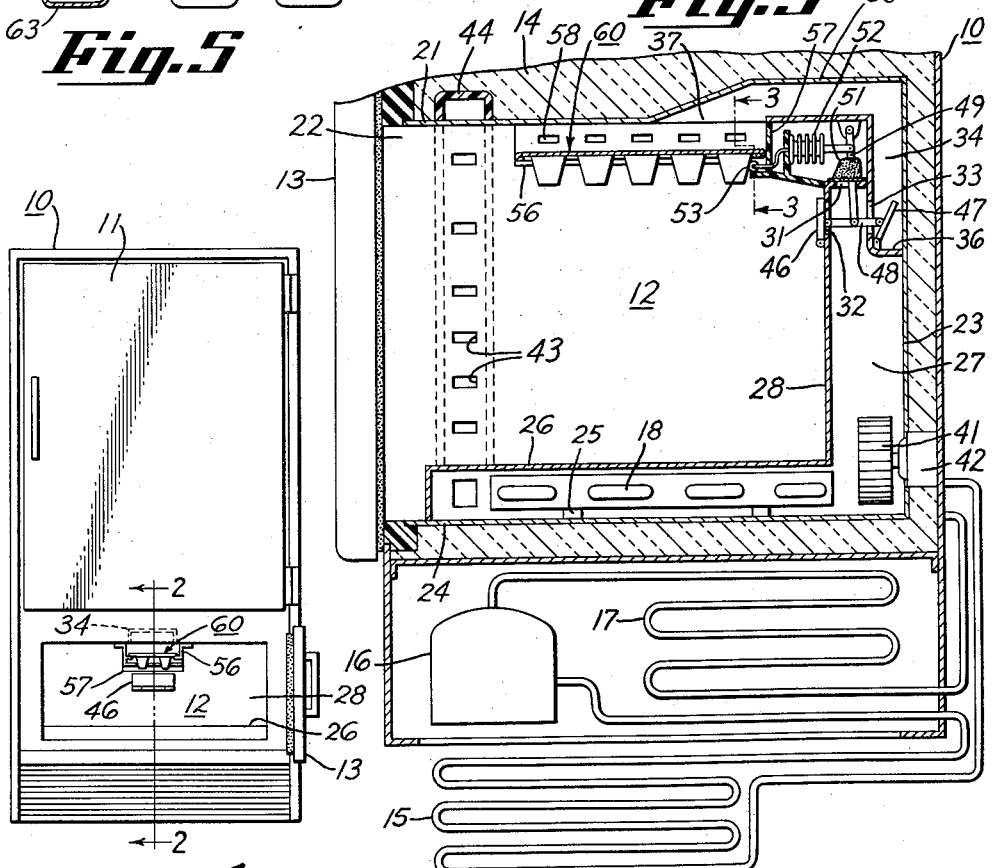
Lloyd M. Keighley

United States Patent Office 3,025,679
Patented Mar. 20, 1962

3,025,679
REFRIGERATION
Lloyd M. Keighley, Kettering, Ohio, assignor to General Motors Corporation, Detroit, Mich., a corporation of Delaware
Filed May 15, 1961, Ser. No. 109,960
7 Claims. (Cl. 62—71)

This invention relates to refrigerating apparatus and particularly to making and harvesting ice blocks from a freezing device or mold employed in household refrigerators.

Household refrigerators presently offered for sale to the public having a frozen food storage or freezing chamber therein refrigerated by circulating air therefrom over an evaporator of a refrigerating system, associated with the chamber but located outside or beyond walls of this chamber, for chilling the air to a sub-water-freezing temperature and to discharge the chilled air back into the chamber offers an opportunity of congealing or freezing water contained in a freezing device or mold located within the chamber more rapidly than has heretofore been possible or accomplished in former household refrigerators.

I contemplate taking advantage of this opportunity with the result that the number of freezing devices, trays or ice block molds ordinarily furnished or included in the sale of a household refrigerator can be reduced without objections on the part of the purchaser of the refrigerator.

An object of my invention is to provide an improved method and arrangement for making an ice block or blocks in a freezing device or mold within a chamber of a refrigerator and of freezing or harvesting same therefrom.

Another object of my invention is to freeze water in a mold or compartment of a freezing device by exposing the surface of water to a cooling medium maintained at a temperature of from 0° to 10° F. while initially secluding wall portions thereof out of direct contact with the cooling medium for congealing the water from the top downwardly in the mold or compartments of the freezing device and to produce relative movement between the cooling medium and the mold or device when the surface of water therein has been frozen whereby the cooling effect of the medium is thereafter directed onto previously secluded wall portions of the mold or compartments so as to increase the rapidity at which the water freezes into a solid ice block.

A further object of my invention is to provide an arrangement which is responsive automatically at specified intervals for shifting the direction of flow of a cold air stream circulated into a chamber containing an ice block making device or mold to discharge the cold air over or into contact with various portions of the mold or device at different times so as to insure rapid freezing of water therein and self-loosening of an ice block or blocks from walls thereof to facilitate its or their harvesting.

In carrying out the foregoing objects it is a still further and more specific object of my invention to provide means for controlling flow of a cold concentrated air stream discharged into a freezing chamber having a water containing mold disposed therein for quickly starting congelation of the water as the means directs the air stream into engagement with one portion of the mold while initially shielding and secluding other wall portions of the mold out of contact with the air stream and which means is responsive to a predetermined reduction in temperature of the congealing water to change the direction of flow of the air stream to thereafter direct same into contact with the initially secluded mold wall portions for increasing the rapidity with which the water freezes into a solid block of ice in the mold.

Further objects and advantages of the present invention will be apparent from the following description, reference being had to the accompanying drawings wherein a preferred embodiment of the present invention is clearly shown.

In the drawings:

FIGURE 1 is a front view of a multiple chambered household refrigerating apparatus or cabinet with its freezing chamber door opened showing a mold or freezing device supported therein;

FIGURE 2 is an enlarged fragmentary sectional view taken along the line 2—2 of FIGURE 1 diagrammatically showing a refrigerating system associated with the refrigerator cabinet;

FIGURE 3 is an enlarged fragmentary sectional view taken along the line 3—3 of FIGURE 2 showing a thermal bulb mounted in the freezing chamber for engagement by the mold;

FIGURE 4 is a broken top view of a mold or freezing device employed in the present invention;

FIGURE 5 is a side view of a mold or device taken along the line 5—5 of FIGURE 4 partly in section and partly in elevation;

FIGURE 6 is a large cross-sectional view through one mold or compartment of the freezing device illustrating congelation of water from the top downward therein;

FIGURE 7 is a view similar to FIGURE 6 showing an ice block self-loosened from walls of the mold.

Referring now to the drawings, for illustrating my invention, there is shown in FIGURE 1 thereof a refrigerating apparatus of the multichambered household "no frost" or "frost proof" type refrigerator comprising a cabinet 10 having walls defining an upper unfrozen food storage chamber (not shown) normally closed by an insulated door 11, and a lower frozen food storage or freezing chamber 12 insulated from the upper chamber, with its insulated door 13 in open position. Insulating material 14 is disposed between outer walls of cabinet 10 and the metal liners of the chambers in the cabinet. The interior of upper chamber in cabinet 10 is cooled to a temperature above freezing, say, for example, between 37° and 43° F., preferably by a plate-like, sheet metal refrigerant evaporator, diagrammatically illustrated by the reference numeral 15 in FIGURE 2, of a refrigerating system associated with the apparatus or cabinet 10. This refrigerating system also includes a sealed casing 16 containing a motor-compressor unit, a condenser 17 and another refrigerant evaporator 18, all connected together in fluid flow relationship by suitable pipes or conduits as is conventional in the art. The interior of lower chamber 12 of cabinet 10 is cooled to a sub-water-freezing temperature by the refrigerating effect produced by evaporator 18 of the refrigerating system for freezing foods, storing frozen foods and/or for freezing water in molds or compartments of a freezing device into ice blocks for table use in chilling salads or the like and drinks in glasses. Wire-like slidable shelves, drawers or baskets (not shown) may be mounted in chamber 12 for supporting packages of frozen foods or the like therein.

Chamber 12 has a box-like metal liner providing integral top, side and rear walls 21, 22 and 23 respectively and a bottom wall 24 thereof. Evaporator 18 is supported on chamber wall 24, by a plurality of insulator blocks or spacers 25, out of contact or thermal conductivity therewith and this evaporator is briefly of the finned type having a sheathed electric resistance heater (not shown) incorporated therein and extending through or across its fins. A false bottom 26 is secured in chamber 12, spaced from evaporator 18, and provides an air duct or passageway across the lower part of the chamber which communicates with a centrally located air duct or passageway 27 at the rear of cabinet 10 formed by an upright wall 28. The spacing of false bottom 26 from evaporator 18 and support of this evaporator on the insulators 25 mounts same beyond walls of chamber 12 out of thermal conductive relationship therewith. Top portion of wall 28 inwardly of its juncture with rear wall 23 of chamber 12 is bent or preformed to provide a partition in duct or passageway 27. This preformed or bent portion of wall 28 is provided with an elongated slot 31 and opposed apertures 32 and 33 respectively. Aperture 32 forms one of two spaced-apart air inlet ports to chamber 12 and aperture 33 opens into a duct or passageway 34 provided by a horizontal extension 36 of wall 23. Passageway or duct 34 communicates with chamber 12 by way of an opening 37 located in the rear central part of top wall 21 and provides the other of the spaced-apart air inlet ports to the chamber. A fan or blower 41 is mounted within duct or passageway 27 adjacent the juncture of the air inlet duct, beneath false bottom 26, and upright wall 28. Blower or fan 41 is mounted on a shaft of an electric driving motor 42 therefor located outside chamber 12. Air is drawn out of chamber 12 by way of air outlet openings 43 provided in the front part of the chamber side walls 22 through suitable air duct panel members 44 beyond these walls into the inlet duct false bottom 26 by the blower 41 over or across evaporator 18 to chill the air to a sub-water-freezing temperature of between 0° and 10° F. This chilled air provides or forms a cooling medium which is circulated at this very low temperature upwardly in duct 27, by blower 41, and discharged into the chamber 12 in a substantially concentrated stream thereof through either one of the spaced-apart chamber inlet openings or ports 32 or 37, in carrying out my invention, so as to maintain the interior of the chamber at a temperature of, for example, between 15° to 20° F. The refrigerating apparatus is herein only briefly described and I therefore make reference to the L. J. Mann Patent No. 2,912,834 dated November 17, 1959, for a more complete or full detailed description of the general arrangement, the refrigerating system and its control. A refrigerating apparatus of the type herein illustrated is, as heretofore explained, slightly modified over that shown in the Mann patent to render my invention feasible.

It is to be noted that in the present disclosure I provide means for controlling the apertures 32 and 33 whereby to alternately discharge the cooling medium or concentrated chilled air stream through the air inlet openings or ports 32 and 37 into chamber 12. This means includes valves, dampers or doors 46 and 47 for apertures 32 and 33 respectively which are hinged or pivotally mounted in any suitable or conventional manner at their bottom edge. A tie rod or link 48 is suitably secured to each damper 46 and 47 for actuating them in unison. An arm 49 pivotally mounted to a bracket secured to top wall 21 of chamber 12 depends therefrom through slot 31 and has its bottom end connected to tie rod 48. An air seal, in the form of a resilient rubber-like diaphragm or bellows 51 is secured to arm 49 and to the top of wall 28, is provided so as to prevent flow of the chilled air through slot 31. A metal bellows 52, communicating with a thermal bulb 53, has its one end attached to arm 49 and serves to move same for actuating rod 48 and consequently dampers or doors 46 and 47. Thermal responsive units of the type having a volatile fluid sealed in a bulb communicating with an expansible and contractible bellows are well known in the art and no detailed description thereof is herein required. A guide or supporting means, preferably formed of nonmetallic molded plastic material, is stationarily secured in any desirable or well known manner to top wall 21 of chamber 12 beneath port 37. This means comprises opposed spaced-apart rail-like portions 56 and an integral stop or back portion 57 with the upright part of portions or supports 56 having a plurality of slotted openings 58 therein. Back portion 57 is provided with integral extensions or projections one of which provides a mounting for one end of the bellows 52 and the other of which provides a supporting ledge for the thermal bulb 53. Bulb 53 may be locked to its supporting ledge in any desired or well known fashion and this bulb can, for the purpose of my invention, instead of being cylindrical throughout its entire length, be provided with arcuate-shaped depressions in a side thereof to be contacted by a rounded wall mold or compartment of a freezing device to be inserted into chamber 12 and pushed into thermal engagement with the bulb for rendering it more sensitive to temperature changes. Lowermost parts of the extending or projecting portions of the molded plastic support means forms a shield beneath bellows 52 so as to prevent flow of the very low temperatured chilled air thereover. Rail-like portions or supports 56 on the molded plastic means are adapted to slidably and suspendingly support a freezing device or mold, generally represented by the reference numeral 60, therefrom within chamber 12 spaced out of contact with evaporator 18 and located directly below air discharge opening or port 37. The mold or freezing device 60 is also spaced from metal walls of chamber 12 and is consequently out of thermal conductive relationship therewith. Device or mold 60 is best shown in FIGURES 4 and 5 of the drawings and can be formed of any suitable or desirable material and is preferably of a tray or pan-like character including a flat closed top wall or portion 61 with its peripheral sides bent over to rid it of sharp edges. Top 61 of mold or device 60 has a plurality of depressions therein providing upright side walls 62 and a closed bottom wall 63 of molds, seals, pockets or compartments preferably, although not necessarily, cylindrical in horizontal cross section. Side walls 62 of device or mold 60 are inclined with respect to the vertical or, in other words, converge downwardly toward the bottom wall 63 to provide open top molds or compartments adapted to receive and retain water therein to be frozen into ice blocks. This type of freezing device or mold forms a plurality of compartments therein each provided with its individual spaced-apart separate wall portions below the level of water adapted to be contained therein.

The damper, valve or door 46 of the present disclosure is normally open and damper or door 47 is normally closed with blower 41 discharging air into chamber 12 by way of inlet port 32. In practicing my invention the receptacles, compartments or pockets of freezing device 60 are substantially filled with water and the mold is placed in chamber 12 by sliding it along the support rails 56 against stop 57 so that a wall 62 of the compartments or pockets at one end of the mold are pushed into intimate thermal contact with bulb 53. This act causes heat of mold or device 60 and its water content to immediately be conducted to fluid sealed in bulb 53 and bellows 52 which fluid, upon absorbing the heat, expands and moves the bellows 52 to shift arm 49 to the right, as shown in FIGURE 2 of the drawings, to actuate valve or door 46 into closed position and valve or door 47 into open position. The chilled air cooled by evaporator 18 is now circulated by blower 41 by way of duct or passageway 27, through aperture 33, passageway 34 and discharged in a concentrated stream thereof through inlet port 37 into chamber 12. This chilled concentrated stream of air or cooling medium is discharged over the top of mold 60 across or into contact or engagement with the surface of water in the mold and thence flows into chamber 12 through the elongated openings 58 and over the front of mold 60 to refrigerate contents of the chamber. During discharge of the cooling medium or flow of the chilled air stream into chamber 12 by way of port or opening 37, the top wall 61 of device or mold 60 shields, isolates or secludes spaced individual wall portions 62 and 63 of compartments in the mold, below the level of water therein, out of direct contact thereby. By virtue of shielding or secluding wall portions 62 and 63 of mold 60 in this fashion and of an inherent temperature differential between the 0° to 10° F. chilled air stream and the somewhat quieter 15° to 20° F. air in the main body portion of chamber 12, water in the mold compartments congeals or freezes across its surface and progressively from top downwardly therein. After the surface of water in compartments of mold 60 freezes over, the temperature of water or the congealing mass or bodies thereof below their surfaces is reduced and this temperature reduction is conducted to bulb 53 and the fluid in the thermo system condenses to contract or move bellows 52 to the left, as viewed in FIGURE 2 of the drawings, to again shift arm 49 and simultaneously close damper or door 47 and open damper or door 46. Now with damper or door 47 occluded and aperture 32 opened, the direction of flow of the cooling medium or concentrated chilled air stream over the top of mold 60 is stopped and its direction of flow is shifted whereby the chilled air is discharged by blower 41 into chamber 12 through port 32 beneath the mold. The cooling medium or chilled air stream is thereafter directed intermediate compartments of the mold or freezing device onto or into contact with the previously secluded spaced-apart individual wall portions 62 and 63 of mold 60. By providing relative movement between the cooling medium and mold 60 such as shifting the chilled concentrated air stream in the fashion described and at a proper time, I increase the rapidity with or at which bodies of water in that part of the mold bounded by the spaced-apart individual secluded wall portions thereof freezes into solid blocks of ice. The intensified or increased rate in the freezing of the ice block or blocks in mold 60 below the top thereof causes final freezing of water to expand and react against the bottom of the mold for self-loosening an ice block or blocks from walls thereof. In fact, the final freezing occurs with a flashing-like action which virtually insures loosening of the ice block or blocks from the mold walls and movement thereof upwardly relative to the bottom of the mold as distinguished from slower freezing of an ice block and from freezing or loosening same by distorting walls of the mold. After freezing and self-loosening the ice block or blocks in the manner described mold or device 60 is then moved with respect to or removed from chamber 12 and is rotated in or outside the chamber into a substantially inverted position over an ice bucket or the like for ejecting the blocks of ice from or permitting them to gravitationally fall out of the mold.

While the principle of freezing water in a mold from the top downwardly therein is incorporated in the present disclosure, I am aware of the fact that this principle is not broadly new per se. Nevertheless it should, from the foregoing, be apparent that I have provided a novel combination and improvement in the art of making ice blocks in a mold, freezing or loosening them from walls thereof and of harvesting the ice blocks in less time than has ever been accomplished in prior refrigerators. The rapidity at which water is frozen into a solid ice block, subsequent to the freezing over of its exposed surface, is unique in that it virtually insures complete loosening of the block of ice from walls of a mold. These and other features are more readily attained in a shiftable, very cold concentrated air stream as compared to relatively slower ice block freezing accomplished by thermal conductivity or by a stationary stream of cold air discharged in one direction into contact with an ice block making mold or freezing device.

While the embodiment of the present invention as herein disclosed constitutes a preferred form, it is to be understood that other forms might be adopted.

What is claimed is as follows:

1. An ice maker comprising in combination, walls defining a chamber, a refrigerating system including a refrigerant evaporator mounted beyond walls of said chamber and located out of thermal conductivity therewith, a blower for circulating air to and fro said chamber over said evaporator to chill the air to a sub-water-freezing temperature, a mold containing water to be frozen, supported within said chamber, said blower discharging air in a concentrated chilled stream thereof over the top of said mold across and into engagement with the surface of water in the mold, said mold secluding wall portions thereof below the level of water therein out of direct contact with the chilled concentrated air stream discharged thereover to congeal the water from the top downwardly in the mold, means actuated automatically in response to a predetermined reduction in temperature of the congealing water in the mold for shifting the direction of discharge of the concentrated chilled air stream circulated into said chamber to stop its flow over the top of said mold and to thereafter direct same into contact with its said wall portions, the shifting of said chilled air stream increasing the rapidity at which water in that part of the mold bounded by said wall portions thereof freezes into a solid block of ice to cause final freezing of the water to expand and react against the bottom of said mold for self-loosening the ice block from walls thereof, and said mold being movable into a position for ejecting the loosened block of ice therefrom.

2. An ice maker comprising in combination, walls defining a chamber, a refrigerating system including a refrigerant evaporator mounted beyond walls of said chamber and located out of thermal conductivity therewith, said chamber being provided with air outlet ports and spaced-apart air inlet ports in walls thereof, a blower for circulating air from said chamber over said evaporator and back into the chamber through said inlet ports to chill the air to a sub-water-freezing temperature, a mold containing water to be frozen supported within said chamber intermediate said spaced-apart air inlet ports, means for controlling said inlet ports, said blower discharging chilled air in a concentrated stream thereof through one of said inlet ports over the top of said mold across and into engagement with the surface of water in the mold, said mold secluding wall portions thereof below the level of water therein out of direct contact with the concentrated chilled air stream discharged thereover to congeal the water from the top downwardly in the mold, said means being actuated automatically in response to a predetermined reduction in temperature of the congealing water in the mold for closing said one inlet port and opening the other of said inlet ports so as to shift the direction of discharge of the concentrated chilled air stream into said mold and to thereafter direct same through said other inlet port into contact with said wall portions of the mold, the shifting of said chilled air stream increasing the rapidity at which water in that part of the mold bounded by said wall portions thereof freezes into a solid block of ice to cause final freezing of the water to expand and react against the bottom of said mold for self-loosening the ice block from walls thereof, and said mold being movable into a position for ejecting the loosened block of ice therefrom.

3. In the art of making and harvesting ice from a mold containing water disposed in a chamber out of thermal conductivity with an evaporator of a refrigerating system associated with the chamber and located beyond walls thereof which comprises; chilling air to a sub-water-freezing temperature outside the chamber by said evaporator, discharging the chilled air through one port of entry into the chamber in a concentrated stream thereof over the mold across the surface of water therein while initially secluding wall portions of said mold below the water level out of direct contact with the chilled air stream for congealing the water progressively from the top downwardly in the mold, stopping the flow of the chilled concentrated air stream over the mold in response to a reduction in temperature of the congealing water therein and thereafter discharging the stream of air into the chamber through another port of entry thereof onto the previously secluded wall portions of the mold, utilizing the concentrated chilled air stream discharged into the chamber through said another port to increase the rapidity at which water in that part of the mold bounded by its said wall portions freezes into a solid block of ice for causing final freezing of the water to expand and react against the bottom of said mold to self-loosen the ice block from walls thereof, and then moving the mold into a position for ejecting the loosened block of ice therefrom.

4. In the art of making and freeing ice from a mold containing water located in a chamber which comprises; chilling air outside the chamber to a sub-water-freezing temperature, discharging the chilled air through one port of entry into the chamber in a concentrated stream thereof over the mold across the surface of water therein while initially secluding wall portions of said mold below the water level out of direct contact with the chilled air stream for congealing the water progressively from the top downwardly in the mold, stopping flow of the chilled concentrated air stream over the mold after the surface of water in said mold freezes and thereafter discharging the stream of air into the chamber through another port of entry thereof onto the previously secluded wall portions of the mold, and utilizing the concentrated chilled air stream discharged into the chamber through said another port to increase the rapidity at which water in that part of the mold bounded by its said wall portions freezes into a solid block of ice for causing final freezing of the water to expand and react against the bottom of said mold to self-loosen the ice block from walls thereof.

5. In the art of making and harvesting ice from a mold containing water and located in a chamber which comprises; exposing the surface of water in the mold to a cooling medium above said mold while initially secluding wall portions thereof out of direct contact with the cooling medium for congealing the water progressively from the top downwardly in the mold, shifting the cooling medium relative to the mold in response to a reduction in temperature of the congealing water therein to thereafter direct its cooling effect onto the previously secluded mold wall portions, utilizing the shifted cooling medium to increase the rapidity at which water in that part of the mold bounded by its said wall portions freezes to a solid block of ice for causing final freezing of the water to expand and react against the bottom of said mold to self-loosen the ice block from walls thereof, and then moving the mold into a position for ejecting the loosened block of ice therefrom.

6. In the art of making and freeing ice from a mold having a plurality of compartments each provided with separate spaced-apart individual wall portions below a level of a body of water adapted to be contained therein and frozen within a chamber which comprises, exposing the surface of water in the compartments to the refrigerating effect of a cooling medium above the mold while initially secluding individual wall portions of said compartments out of direct contact with the cooling medium for congealing the water progressively from top downwardly in the mold, producing relative movement between the cooling medium and mold after the surface of water in compartments thereof freezes to then direct the refrigerating effect of the cooling medium intermediate said compartments onto the previously secluded spaced individual wall portions thereof, and utilizing said relative movement to increase the rapidity at which the bodies of water in that part of the compartments bounded by said wall portions freezes into solid blocks of ice for causing final freezing of the water to expand and react against the bottom of said compartments to self-loosen the blocks of ice from walls thereof.

7. An ice maker comprising in combination, walls defining a chamber, a refrigerating system including a refrigerant evaporator located beyond walls of said chamber and mounted out of thermal conductive relationship therewith, a blower for circulating air to and from said chamber over said evaporator to chill the air to a sub-water-freezing temperature, a mold having rigid walls immovable with respect to one another supported within said chamber spaced out of contact with said evaporator and containing water to be frozen by the circulated air, said blower discharging the chilled air in a concentrated stream thereof over the top of said mold across and into engagement with the surface of water in the mold, said mold secluding wall portions thereof below the level of water therein out of direct contact with the concentrated chilled air stream discharged thereover to congeal the water from the top downwardly in the mold, means rendered effective after the surface of water in said mold freezes for shifting the direction of flow of the concentrated chilled air stream to stop its circulation over the top of said mold and direct same onto said secluded mold wall portions, and the shifting of said chilled air stream increasing the rapidity with which water in that part of the mold bounded by said secluded wall portions freezes into a solid block of ice to cause final freezing of the water to expand and react against the bottom of said mold for self-loosening the ice block from walls thereof whereby the block of ice moves upwardly in the mold as distinguished from freeing the block of ice therefrom by distorting the mold walls.

References Cited in the file of this patent

UNITED STATES PATENTS

| | | |
|---|---|---|
| 2,037,417 | Hull | Apr. 14, 1936 |
| 2,487,408 | Askin | Nov. 8, 1949 |
| 2,780,923 | Jones | Feb. 12, 1957 |
| 2,826,046 | Tobiasz | Mar. 11, 1958 |